United States Patent [19]

Nakamura

[11] Patent Number: 4,538,349
[45] Date of Patent: Sep. 3, 1985

[54] COIL FITTING SYSTEM

[75] Inventor: Kenichi Nakamura, Yachiyo, Japan

[73] Assignee: Hitachi, Ltd., Tokyo, Japan

[21] Appl. No.: 521,391

[22] Filed: Aug. 8, 1983

[30] Foreign Application Priority Data

Aug. 13, 1982 [JP] Japan ................................ 57-139721
Feb. 10, 1983 [JP] Japan ................................. 58-19690

[51] Int. Cl.³ ........................................ H02K 15/085
[52] U.S. Cl. ........................................ 29/736; 29/596
[58] Field of Search ................ 29/596, 732, 736, 734, 29/606

[56] References Cited

U.S. PATENT DOCUMENTS 3,885,288  5/1975  Lund ...................................... 29/736
3,949,464  4/1976  Walker ............................. 29/734 X Primary Examiner—Carl E. Hall
Attorney, Agent, or Firm—Antonelli, Terry & Wands

[57] ABSTRACT

A coil fitting system including a pressing member for fitting in slots of an iron core of an electric rotary machine in one operation step a plurality of coils arranged in such a manner that a portion of one coil end portion overlaps a portion of another coil end portion. The pressing member which is formed at its peripheral edge portion with a plurality of grooves includes a first pressing surface and a second pressing surface. A portion of the pressing member constituting the first pressing surface extends into a region located on an extension in a coil pressing direction of the grooves located radially of such portion, and the first pressing surface corresponds to the coil end portion of one coil. The second surface portion supports, in spaced-apart relation to the first pressing surface in the coil pressing relation, the coil end portion of another coil arranged such that a portion thereof overlaps a portion of the coil end portion corresponding to the first pressing surface.

13 Claims, 20 Drawing Figures

F I G. 2
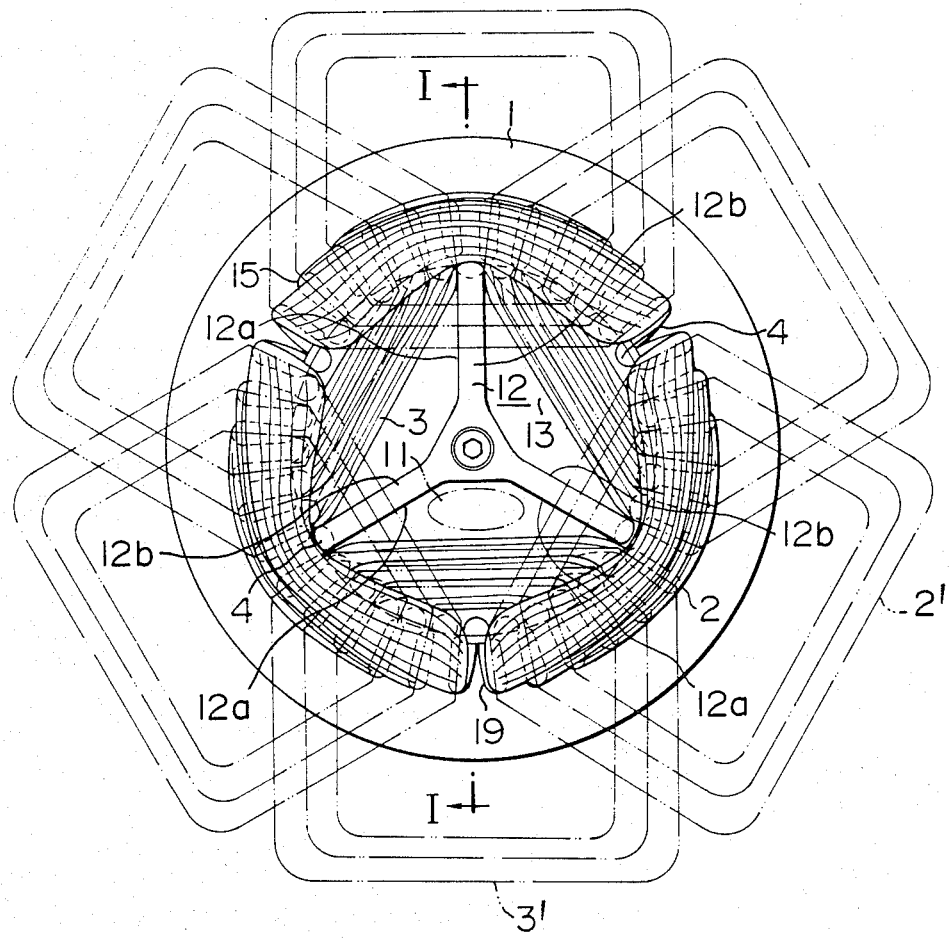

12e  4e 12g  4g 12i  4i 12k  4k 12m  4m

COIL FITTING SYSTEM

BACKGROUND OF THE INVENTION

This invention relates to coil fitting systems for fitting coils in the slots of an iron core of an electric rotary machine by forcing the coils into the slots, and more particularly it is concerned with improvements in or relating to a coil fitting system for fitting, in a single operation, into the slots a plurality of coils arranged in such a manner that a portion of an end portion of one coil overlaps a portion of an end portion of another coil.

An iron core of an electric rotary machine constitutes a stator which is formed at its central portion with an inner opening for receiving a rotor therein, and a multiplicity of slots open in the inner opening. A multiplicity of coils wound beforehand are required to be fitted in the slots in a predetermined relation. Fitting the coils wound beforehand in the slots of the electric rotary machine of the aforesaid construction is effected by forcing the coils through one side of the inner opening by a pressing member. This type of coil fitting system generally has the following construction.

The coil fitting system comprises a multiplicity of blades arranged axially in the form of a ring as a whole. The ring has a diameter which is substantially equal to the diameter of the inner opening of an armature core in which the slots open, so that the armature core can be force fitted on the ring of blades. The blades adjacent one another in the ring of blades define therebetween gaps which are each equal to or slightly smaller than the opening of each slot in width. The coils of a predetermined shape wound beforehand are hung and held in a predetermined position after being slipped through the gaps. Meanwhile the ring of blades has in the interior a coil stripper serving as a pressing member guided for movement in an axial direction. When the coil stripper is moved in the axial direction after the predetermined shape of coils wound beforehand are hung and held in position in a predetermined position in the ring of blades and the armature core is force fitted about the ring, the coils are moved by the action of the coil stripper and fitted in the slots in the armature core.

In the coil fitting system of the prior art of a this construction, a set of plurality of coils is held in position at coil end portions by the ring formed by the plurality of blades, so that the set of coils is force fitted in the slots in the armature core in one operation. In this system, when coil end portions do not overlap, no trouble occurs. However, when an attempt is made to fit coils whose end portions overlap in one operation step, a coil end portion of one coil held between the coil stripper and a coil end portion of another coil might be compressed and suffer damage.

To obviate this problem of the prior art, Japanese Utility Model Publication No. 44881/76 proposes to use a coil stripper of a special shape. More specifically, the coil stripper is provided with two pressing surfaces including a first pressing surface for pressing against the coil end portion of one coil, and a second pressing surface for pressing against the coil end portion of another coil arranged in such a manner that one portion thereof overlaps one portion of the coil end portion of the one coil pressed by the first pressing surface. The second pressing surface holds the coil pressed thereby in a direction in which the coils are pressed. By this arrangement, the coil end portions overlapping each other are fitted in the slots in the armature core in a condition in which they are spaced apart from each other, thereby obviating the aforesaid problem of the prior art.

However, the use of the coil stripper of this construction would have some problems that should be solved before it is put to practical use. One of them involves the condition of the coil which is force fitted by the second pressing surface or the ease with which fitting of the coil by the second pressing surface is effected. More specifically, the end portion of the coil fitted by the first pressing surface would be moved by the first pressing surface to one side of the end portion following completion of the fitting operation and pushed in a radial direction by an outer edge surface of a portion constituting the first pressing surface, to be shaped thereby. However, as described hereinabove, the first pressing surface remains inside the ring of blades, so that the coil end portion of the coil which is force fitted by the first pressing surface would block an upper portion of each of the gaps defined by the blades. Thus the coil which is force fitted by the second pressing surface would be forced against the upper portions of the blades by the coil which is force fitted by the first pressing surface during the coil fitting operation. What results would be an obstruction to smooth fitting of the coils in the slots, so that it might become difficult to fit the coils or the coils might suffer damage, even if they are successfully fitted. This phenomenon would be marked particularly when the coils have a large pitch or a high volume ratio in the slots. The second problem is that when the coil stripper is restored to its original position following completion of operation of fitting the coils in the slots, the coil stripper might bite into the coils. As described hereinabove, the coil end portion of the coil which is force fitted by the first pressing surface is pushed in the radial direction by the outer edge surface of the portion constituting the first pressing surface, to be shaped thereby. Thus the coil end portion of such coil would press strongly against the outer edge surface and a tension would develop. If the coil stripper is pulled back to restore it to its original position when the coil end portion of the coil is in the aforesaid relation to the outer edge surface of the portion constituting the first pressing surface, a portion of the coil would also be pulled back by the outer edge surface of the portion constituting the first pressing surface, with the result that a portion of the coil would be bitten between the outer edge surface and an inner lateral surface of each blade juxtaposed against the outer edge surface.

SUMMARY OF THE INVENTION

An object of this invention is to provide an improved coil fitting system capable of smoothly fitting coils in the slots in an armature core.

Another object is to provide a coil fitting system which is free from the risk of the pressing member biting into the coils when the former is restored to its original position.

Still another object is to provide a coil fitting system which is free from the risk of a coil end portion of a coil suffering damage when the pressing member is restored to its original position.

A further object is to provide a coil fitting system which is easy to assemble.

To accomplish the aforesaid objects, the invention provides the outstanding features that the pressing member formed at its peripheral edge portion with a multiplicity of grooves includes a first pressing surface and a second pressing surface, and that a portion of the pressing member constituting the first pressing surface extends into a region located at least on an extension in a coil pressing direction of the grooves located at least radially of such portion. The first pressing surface corresponds to a coil end portion of at least one coil. The second pressing surface supports, in spaced-apart relation to the first pressing surface in the coil pressing direction, a coil end portion of another coil arranged in such a manner that a portion thereof overlaps a portion of the coil end portion of the first pressing surface.

By virtue of this feature, the coil end of the coil force fitted by the first pressing surface is shaped further outwardly by the action of the portion extending into the grooves formed at the peripheral edge portion of the pressing member. This makes it possible to reduce the area of the coil that covers upper portions of blades, thereby enabling the coil pressed by the second pressing member to be fitted with increased smoothness in the slots.

In one preferred embodiment of the invention, the portion constituting the first pressing surface either extends into the grooves or has the blades fitted in the grooves secured to such portion. Furthermore, the extension interfits the blades fitted in the associated grooves. Thus when the pressing member is restored to its original position, the pressing member is prevented from biting into a portion of the coil.

In another preferred embodiment, the portion constituting the first pressing surface of the pressing member and a portion constituting the second pressing surface are separate entities which are assembled with each other. This facilitates production.

BRIEF DESCRIPTION OF THE DRAWINGS

FIG. 2 is a plan view of the coil fitting system shown in FIG. 1;

DESCRIPTION OF THE PREFERRED EMBODIMENTS

Figure 1:
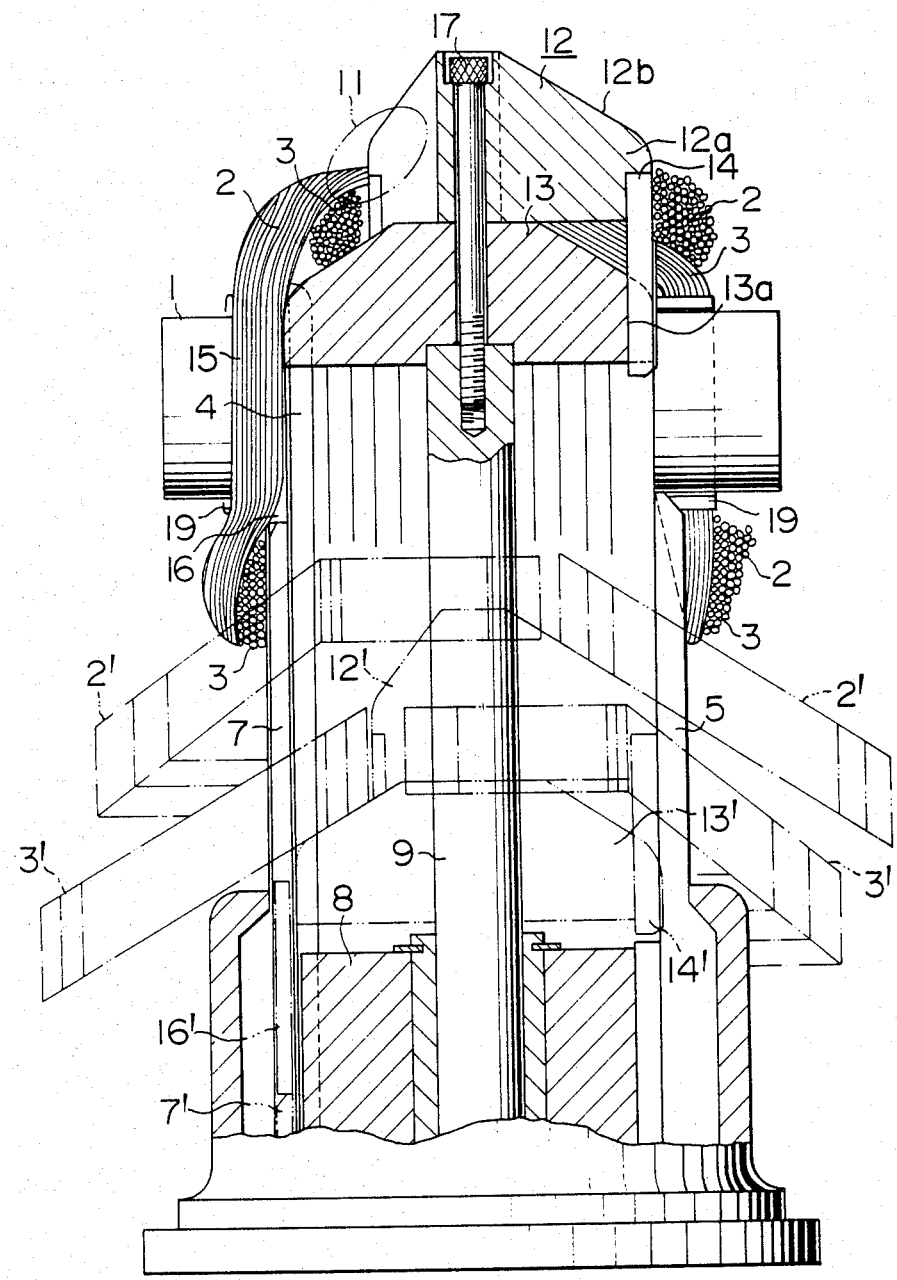
FIG. 1 is a vertical sectional view of the coil fitting system comprising one embodiment of the invention, taken along the line I—I in FIG. 2.

One embodiment of the invention shown in FIGS. 1–3 will be described. Blades 4 are arranged in the form of a ring in a manner to correspond to slots 15 of a magnetic core 1 and connected at lower ends thereof to a base 8 by pins, not shown. Wedge guides 5 are arranged in the form of a ring located outside the blades 4. A second stripper 13 which is a block having a conical inclined surface is mounted on an upper end of a rod 9 by means of a bolt 17. The rod 9 is driven to move vertically by drive means, not shown, which may be in the form of a hydraulic cylinder. The stripper 13 is formed on its outer peripheral surface with grooves 13a oriented axially of the magnetic core 1 (hereinafter simply axially). The blades 4 are slidably fitted each in one of the grooves 13a. Wedge pushers 7 are mounted each between the adjacent wedge guides 5 arranged in the form of a ring and driven to move vertically by drive means, not shown, which may be hydraulic cylinders, so that the wedge pushers 7 move in a vertical direction in sliding movement along the wedge guides 5.

A first stripper 12 formed with three radially directed pressing members 12a is placed on the second stripper 13 having a substantially conical top surface and secured thereto by the bolt 17. In this embodiment, two stripper blocks are arranged and secured in place in a concentric relation to provide a stripper. The first stripper 12 has a bottom surface which is planar and extends horizontally. The first stripper 12 of this configuration is stacked on the top surface of the conical shape of the second stripper 13, so that the stripper has a dual-stage construction.

The first stripper 12 has an outer peripheral portion which extends into the grooves 13a to substantially the same position as outer portions of the blades 4 and has substantially the same diameter as the magnetic core 1, so that the first stripper 12 can be inserted into the magnetic core 1. Cutouts 11 of a size large enough to allow one layer of coil to extend therethrough are formed between each two of the three radially extending pressing members 12a of the first stripper 12.

Figure 3:
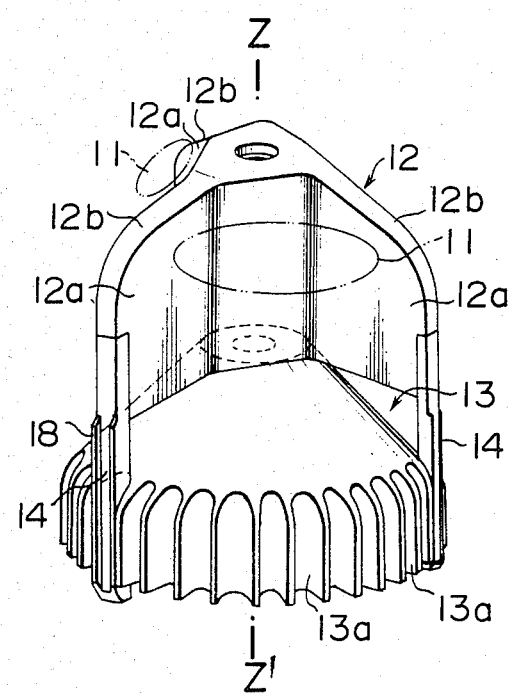
FIG. 3 is a perspective view of a coil stripper constituting the pressing member shown in FIG. 1.

FIG. 3 shows in a perspective view the first stripper 12 and second stripper 13 of this embodiment. The multiplicity of grooves 13a located on the outer peripheral surface of the second stripper 13 are oriented along its axis z–z'. The grooves 13a have the blades 4 and moving blades, subsequently to be described, fitted therein. Three moving blades 14 are fixed to the outer periphery of the first stripper 12. Unlike the blades 4, the moving blades 14 are secured to the first stripper 12, so that when the first stripper 12 moves in a vertical direction the moving blades 14 also move with the first stripper 12 in the same direction. The first stripper 12 is essentially shaped like a cannon ball, but the provision of the three cutouts 11 makes the radially extending pressing members 12a appear like vertical vanes. The movable blades 14 are three in number and each is secured to a lower end of one of the three pressing members 12a of the vertical vane type and located at the outer periphery of the first stripper 12 in parallel to the center axis z–z'. The movable blades 14 are smoothly contiguous at the outer lateral surfaces of their upper end portions with a surface of the stripper 12 on its advancing side (upper side in the figure), and fitted at their lower ends in the grooves 13a of the second stripper 13. Thus the relative positions of the first stripper 12 and second stripper 13 in a radial direction are regulated by the moving blades 14. The moving blades 14 may be secured to the first stripper 12 by any known means as desired. They may be joined by welding, adhesively attached, connected by pins or secured by screws to the first stripper 12, or may be secured at the other end to the second stripper 13 by any known means, such as screwing. In the embodiment shown and described hereinabove, the number of the blades 4 is reduced by three and three moving blades 14 are fitted in the grooves 13a from which the blades 4 are removed, fitting the blades 14 in the rest of the grooves 13a.

An operation of fitting a first layer coil 2 and a second layer coil 3 including one portion overlapping a coil end portion of the coil 2 in the slots 15 of the magnetic core 1 by using the coil fitting system of the aforesaid construction will be described. First, the first and second strippers 12 and 13 are moved downwardly to dash-and-dot line positions shown in FIG. 1, and the first and second layer coils 2 and 3 are set in positions 2' and 3' respectively shown by phantom lines. This embodiment is constructed such that three first layer coils 2' and three second layer coils 3' are set and fitted as shown in FIG. 2. The second layer coils 3' are inserted in a predetermined position between the blades 4 and moved downwardly along the blades 4. They abut against the top surface of the stripper 13 without the first stripper 12 interfering with the downward movement of the second layer coils 3' because of the presence of the cutouts 11. As described hereinabove, the cutouts 11 are each formed to have a size and shape large enough to allow one layer of coil to pass therethrough. The first layer coils 2' are set in such a manner that one side thereof rides on a pressing surface 12b of one of the pressing members 12a of the first stripper 12.

As the first stripper 12 and second stripper 13 are moved upwardly after the coils 2' and 3' are set as described hereinabove, the first stripper 12 pushes up the first layer coils 2 by the pressing surfaces 12b. The first layer coils 2 thus pushed upwardly are fitted axially in the slots 15 of the magnetic core 1 while being guided by the blades 4. When they clear the upper ends of the blades, coil end portions are pressed by the pressing surfaces 12b of the first stripper 12, their outer peripheral surfaces and the outer lateral surfaces of the moving blades 14 toward the outer peripheral side, to be shaped thereby.

As described hereinabove, the second stripper 13 connected to the first stripper 12 moves upwardly while pressing the second layer coils 3 upwardly as the first stripper 12 moves upwardly and at the same time force fits the first layer coils 2 and second layer coils 3 in the slots 15 of the magnetic core 1 after they are pushed upwardly. As the second layer coils 3 clear the upper ends of the blades 4, the coil end portions are pressed toward the outer peripheral side by the top surface and the outer peripheral portion of the second stripper 13.

As can be clearly seen in the description of the operation set forth hereinabove, the coil end portions of the first layer coils 2 and the coil end portions of the second layer coils 3 are inserted, force fitted and shaped independently of each other by the first stripper 12 and the second stripper 13 respectively. There is no risk of the first and second layer coils 2 and 3 suffering damage due to being forced against each other by the forces exerted to insert and fit the coils in the slots.

The first stripper 12 of the embodiment shown and described hereinabove has its radius increased at its outer peripheral portion by an amount corresponding to the width of the blades 4, so that the coil ends of the first layer coils 2 are shaped after being sufficiently expanded. This is conducive to a marked reduction in mutual interference between the first layer coils 2 and second layer coils 3, thereby enabling the second layer coils 3 to be smoothly inserted. The outer peripheral portion of the first stripper 12 is smoothly contiguous with the outer lateral surfaces of the blades 4, avoiding the risk of the coils being caught between the strippers 12 and 13 and the blades 4 as the former moves downwardly. When the coil pitch is large, the diameter of the wire of the coils is too large or too small, or the coils have a high volume ratio, difficulties have been experienced in fitting the coils in the slots of a magnetic core in the prior art. When the embodiment of the invention described hereinabove is used, a plurality of layers of coils can be readily fitted in one operation step and the coil ends located on opposite sides do not become unbalanced in axial length, so that shaping of the coil end portions performed to give a predetermined shape and size thereto after the coil fitting operation is finished is facilitated. This is conducive to a reduction in the number of operation steps and an improvement in the quality of the products.

Figure 4:
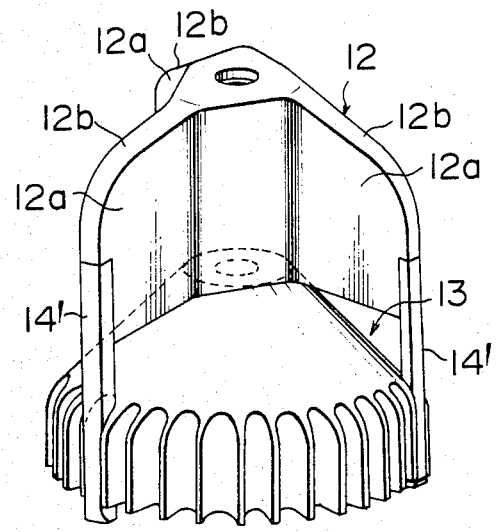
FIGS. 4–6 are perspective views of modifications of the coil stripper shown in FIG. 3.

Modifications of the moving blades 14 will now be described by referring to the embodiment shown in FIGS. 1-3. The moving blades 14 are shown as being each formed with lips 18 in FIG. 3. The blades of a coil fitting system of the prior art each have been formed with lips. In the embodiment of the invention, however, portions (upper half portions) of the moving blades 14 corresponding to the coil end portions of the first layer coils 2 are preferably flat and smooth without having any lips, to avoid damage to the coils. FIG. 4 shows a modification of the moving blades in which the moving blades 14' having no lips are flat and smooth. This type is advantageous where the winding of a coil is small in amount or the coil has a low volume ratio or the conditions for fitting the coils are good.

Figure 5:
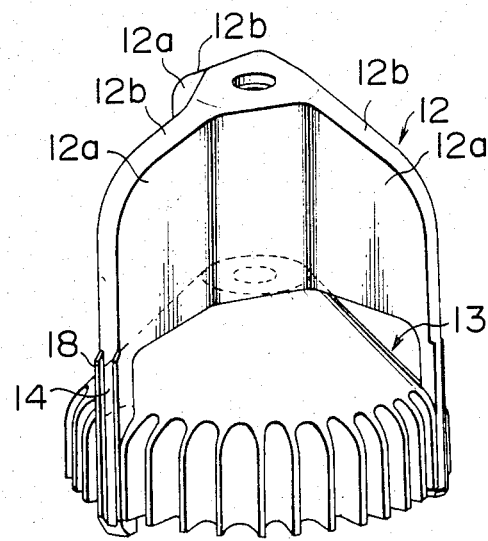
Figure 6:
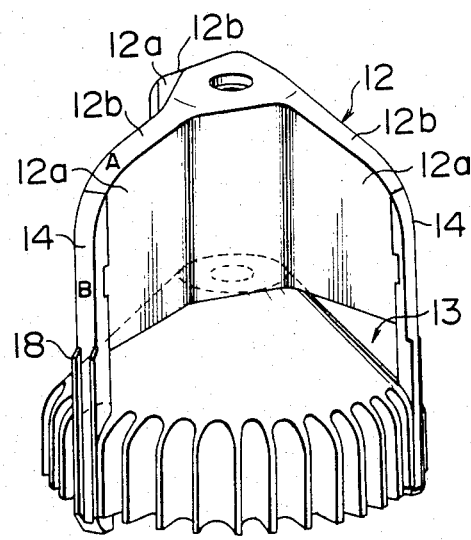

FIG. 5 shows still another modification in which the first stripper 12 and the moving blades 14 are formed into a unitary structure. FIG. 6 shows still another modification in which the moving blades 14 have their upper portions extended upwardly so that their upper end portions each concurrently serve as a portion of one of the pressing surfaces 12b of the first stripper 12. What is essential that in order that the coil fitting system can perform the aforesaid functions, inclined surfaces A on the top of the first stripper 12 are each smoothly contiguous with one of outer peripheral surfaces B of the moving blades 14.

The embodiment shown and described hereinabove may serve as a coil fitting system suitable for use with concentrically wound 3-phase, 4-pole and 36-slot coils of three stages constructed for fitting the first and second layers of coils in one operation step. However, the invention is not limited to the aforesaid type of coils and can have application in coils of a plurality of layers with different specifications for windings for use not only as single phase armature coils but also as multiple phase armature coils. By slightly tilting the moving blades 14 inwardly to impart thereto a release gradient, it is possible to readily detach them from the coils without any trouble.

Figure 7:
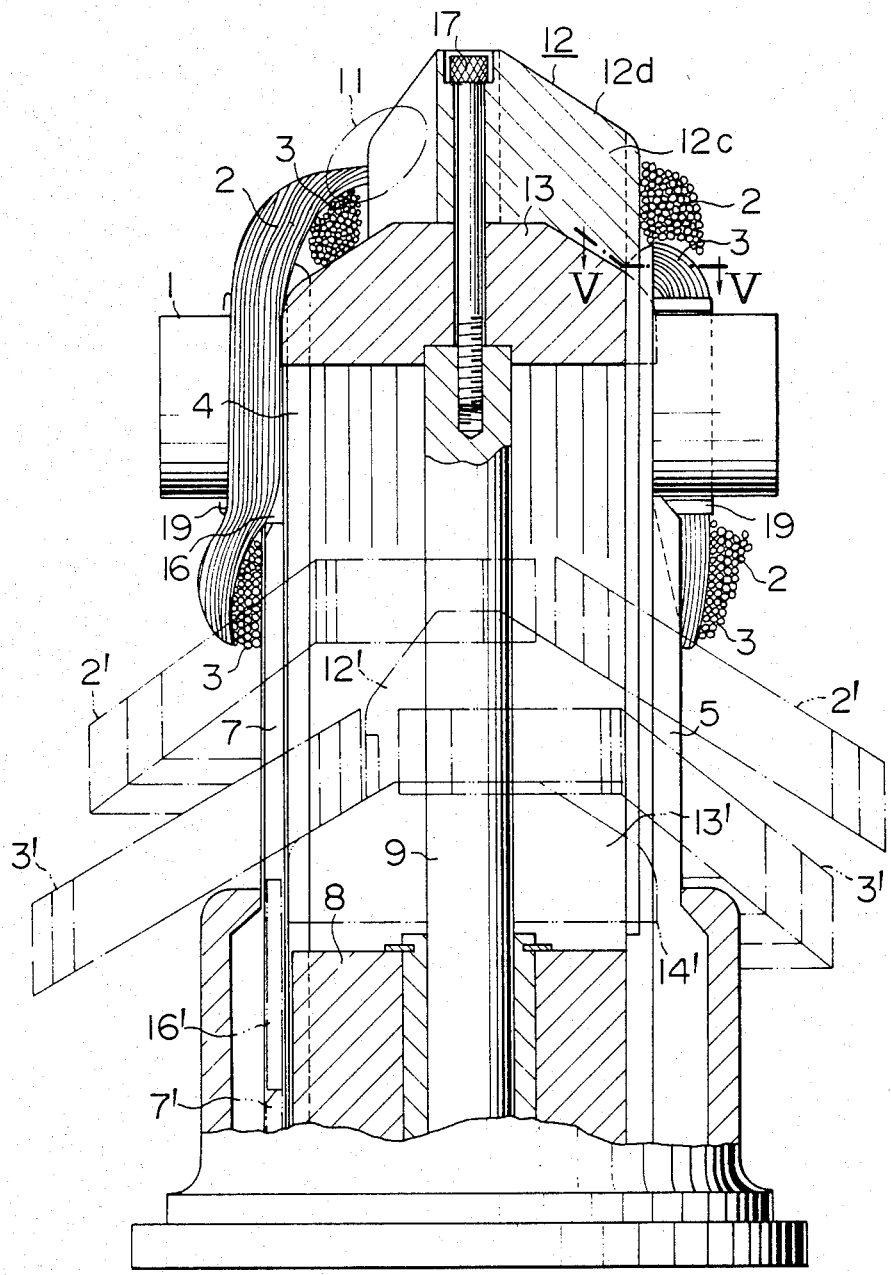
FIG. 7 is a sectional front view of the coil fitting system comprising another embodiment, taken along the line VII—VII in FIG. 8.

Another embodiment of the invention shown in FIGS. 7 and 8 will now be described. This embodiment is distinct from the embodiment shown in FIGS. 1-2 in that the outer peripheral portion of the first stripper 12 extends into the region of the blades into engagement with the blades 4c and for sliding movement.

Figure 10:
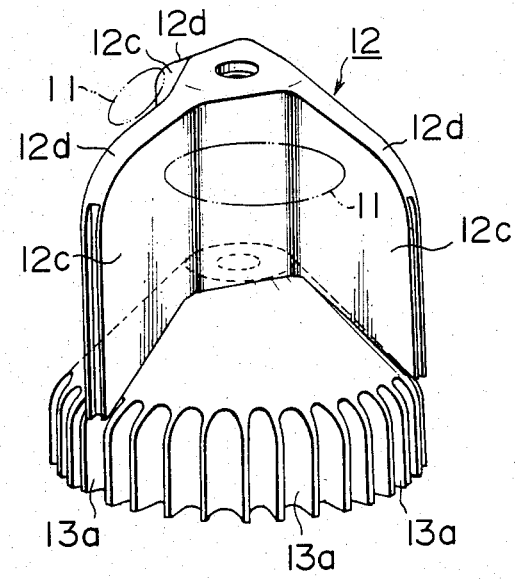
FIG. 10 is a perspective view of the pressing member shown in FIG. 7.
Figure 20:
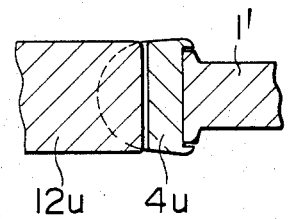

When the first stripper 12 is brought into engagement with the blades in this embodiment, the most simple and yet basic form of engagement that can be achieved is one in which, as shown in FIG. 20, the engagement takes place only on a peripheral surface of the magnetic core. However, when this form of engagement is utilized, the blades might be reduced in rigidity and difficulties might be experienced in setting and maintaining the relative positions of the first stripper 12 and the blades. To avoid this disadvantage, the engagement may take place on more than two surfaces of the magnetic core including peripheral and radial surfaces, as shown in FIG. 10 which shows in a perspective view the first stripper 12 and the second stripper 13 of this embodiment.

The first stripper 12 which is essentially shaped like a cannon ball is formed with three cutouts 11 as is the case with the embodiment shown in FIGS. 1-2, so that it appears to have pressing members 12c of a radially extending vertical vane shape.

Figure 9:
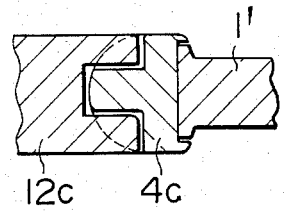
FIG. 9 is a sectional plan view showing, on an enlarged scale, the relation between the portion constituting the first pressing surface shown in FIG. 7 and the blade corresponding thereto.

As shown in FIG. 9, the pressing members 12c are each formed at an outer peripheral portion thereof with a groove extending axially of the magnetic core 1 for engagement with one of the blades 4c.

The second stripper 13 is formed at its outer periphery with a multiplicity of grooves 13a arranged axially for fitting the blades 4 and 4a therein as subsequently to be described.

Figure 11:
FIG. 11 is a perspective view of the blade shown in FIG. 7.

FIG. 11 is a perspective view of the blades 4c engaging the first stripper 12 and second stripper 13. The blades 4c are each formed with an axially extending protrusion for engagement with the first stripper 12 as shown in FIG. 9. The protrusion may be formed to extend along the entire length of the blades. However, in the interest of the rigidity of the blades, the protrusion is preferably formed only in a region of each blade which is brought into engagement with the first stripper 12.

An operation of fitting the first layer coils 2 and second layer coils 3 in the slots 15 of the magnetic core 1 by using the embodiment of the aforesaid construction will now be described. First, the first stripper 12 and second stripper 13 are moved downwardly to positions 12' and 13' respectively indicated by dash-and-dot lines in FIG. 7, and the first layer coils 2 and second layer coils 3 are set in positions 2' and 3' respectively designated by imaginary lines.

Figure 8:
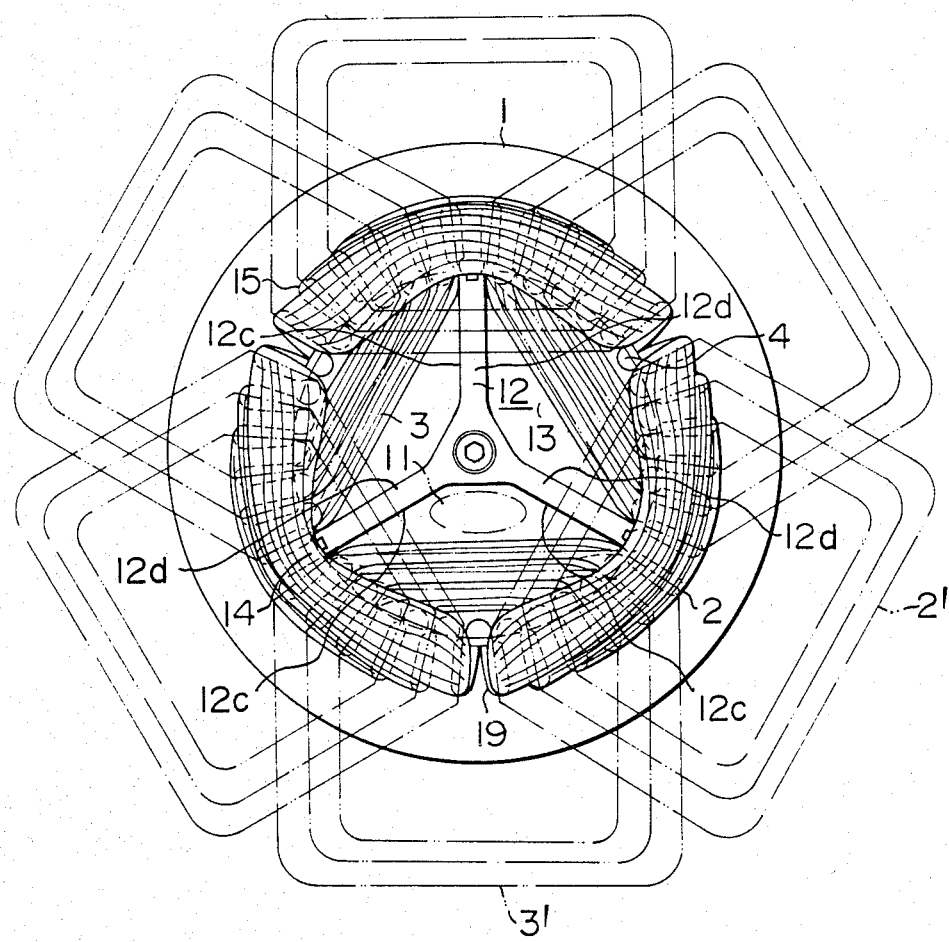
FIG. 8 is a plan view of the coil fitting system shown in FIG. 7.

This embodiment is constructed such that three first layer coils 2' and three second layer coils 3' are set and fitted as shown in FIG. 8. The second layer coils 3' are inserted in a predetermined position between the blades 4 and 4C and moved downwardly along the blades 4 and 4c. They abut against the top surface of the stripper 13 without the first stripper 12 interfering with the downward movement of the second layer coils 3' because of the presence of the cutouts 11. As described hereinabove, the cutouts 11 are each formed to have a size and shape large enough to allow one layer of coil to pass therethrough. The first layer coils 2' are set in such a manner that one side thereof rides on a pressing surfaces 12d of one of the pressing members 12c of the first stripper 12.

Then the magnetic core 1 is fitted about a ring constituted by the blades 4 and 4C and secured in place by core holding means, not shown.

The first stripper 12 and second stripper 13 in the aforesaid condition are then moved upwardly, so that the first stripper 12 moves at its pressing surfaces 12d the first layer coils 2 upwardly. The first layer coils 2 moved upwardly in this fashion are guided by the blades 4 in moving into the slots 15 of the magnetic core 1 axially thereof, and as the first layer coils 2 clear the upper ends of the blades the coil end portions are pressed by the pressing surfaces 12d and the outer peripheral surface of the first stripper 12 toward the outer peripheral side, to be shaped thereby.

As the first stripper 12 moves upwardly as described hereinabove, the second stripper 13 connected thereto moves upwardly while pressing the second layer coils 3 upwardly, and at the same time presses the first layer coils 2 and second layer coils 3 pressed upwardly to force fit same in the slots 15 of the magnetic core 1. As the second layer coils 3 clear the upper ends of the blades 4, the coil end portions are pressed by the top surface and outer peripheral portion of the second stripper 13 toward the outer peripheral side, to be shaped thereby.

As can be clearly seen in the description of the operation set forth hereinabove, the coil end portions of the first layer coils 2 and the coil end portions of the second layer coils 3 are inserted, force fitted and shaped independently of each other by the first stripper 12 and the second stripper 13 respectively. There is no risk of the first and second layers of coils 2 and 3 suffering damage due to being forced against each other by the force exerted to insert and fit the coils in the slots.

The first stripper 12 of this embodiment shown and described hereinabove has its radius increased at its outer peripheral portion by an amount corresponding to the amount of the portion extending into the grooves, so that the coil ends of the first layer coils 2 are shaped after being sufficiently expanded. This is conducive to a marked reduction in mutual interference between the first layer coils 2 and second layer coils 3, thereby enabling the second layer coils 3 to be smoothly fitted in place.

The outer peripheral portion of the first stripper 12 extends into the region of the blades 4c into engagement therewith, as shown in FIG. 9. This eliminates a gap that might otherwise be formed between the forward ends of the blades 4c and the outer peripheral portion of the first stripper 12 and might catch portions of the coils. Additionally the outer peripheral portion of the first stripper 12 has no sharp edges thereon.

Also, the outer peripheral portion of the first stripper 12 and blades 4c are in engagement with each other radially of the magnetic core 1 as shown in FIG. 9. Thus the risk of the coil end portions of the first layer coils 2 being pulled downwardly of the forward ends of the blades 4c can be eliminated when the first stripper 12 moves downwardly.

There is no risk of the coil end portions of the first layer coils 2 suffering damage when the first stripper 12 moves upwardly and downwardly as described hereinabove. When the coil pitch is large, the diameter of the wire of the coils is too large or too small, or the coils have a high volume ratio, difficulties have been experienced in the prior art in fitting the coils in the slots of the magnetic core. When the embodiment of the invention described hereinabove is used, a plurality of layers of coils can be fitted in one operation step and the coil ends on opposite sides do not become unbalanced in axial length, so that shaping of the coil end portions performed to give a predetermined shape and size thereto after the coil fitting operation is finished is facilitated. This is conducive to a reduction in the number of operation steps and an improvement in the quality of the products.

Modified forms of engagement of the outer peripheral portion of the first stripper 12 with the blades will be described by referring to the drawings.

Figure 12:
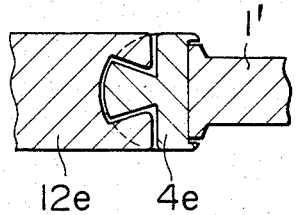
FIGS. 12–20 are sectional plan views corresponding to FIG. 9 but showing modifications of the portion constituting the first pressing surface shown in FIG. 7 and modifications of the blades corresponding thereto.
Figure 13:
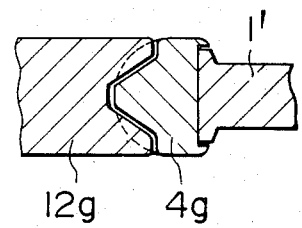
Figure 14:
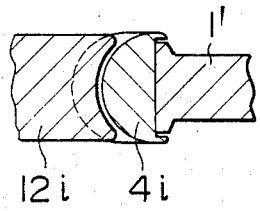

FIGS. 12–14 show the outer peripheral portion of the first stripper 12 formed with grooves and the blades 4e, 4g, 4i each formed with a protrusion, in the same manner as described by referring to FIG. 9.

Referring to FIG. 12, the construction shown therein is capable of increasing the area of the outer peripheral portion of the first stripper 12 brought into contact with the first layer coils 2 over and above the corresponding area of the construction shown in FIG. 9. This construction has particular utility in applications in which the magnetic core has a relatively small size of teeth.

The construction shown in FIG. 13 enables the cross-sectional area of the blades to be increased as compared with the construction shown in FIG. 9, thereby enabling the rigidity of the blades to be advantageously increased.

The construction shown in FIG. 14 enables engagement to be achieved on curved surfaces. This construction is conducive to a reduction in cost because the parts have simple shapes.

Modifications shown in FIGS. 15–18 have constructions which are in reverse of the construction shown in FIG. 9. That is, protrusions are formed on the outer peripheral portion of the first stripper 12 and grooves are formed on the blades.

Figure 15:
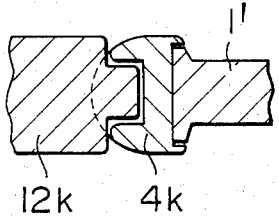
Figure 16:
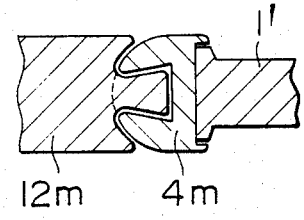

In FIG. 15, a portion of each blade in which the coils are held can be increased in area as compared with the corresponding portion in the construction shown in FIG. 9, thereby increasing the stability with which the coils are held in position. The construction shown in FIG. 16 enables the cross-sectional area of the blades to be increased as compared with the construction shown in FIG. 15, thereby enabling the rigidity of the blades to be advantageously increased.

Figure 17:
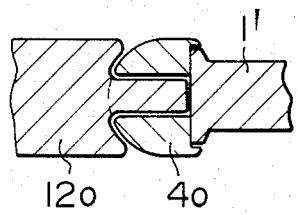

FIG. 17 shows a construction in which the outer peripheral portion of the first stripper 12 is located closer to the magnetic core 1' than in the construction shown in FIG. 15. This construction increases the amount of the first layer coils 2 that are pressed and shaped, thereby increasing the ease with which the second layer coils 3 are fitted.

Figure 18:
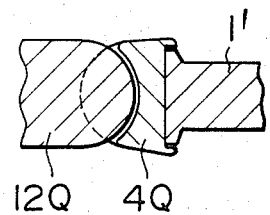

The construction shown in FIG. 18 involves an engagement on curved surfaces. The construction is simple and enables cost to be reduced.

Figure 19:
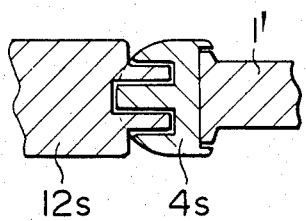

In FIG. 19, there is shown a construction which is similar to that shown in FIG. 9 in that protrusions are formed on the outer peripheral portion of the first stripper 12 and grooves are formed on the blades. However, the construction shown in FIG. 19 is more advantageous than that shown in FIG. 9 in that the rigidity of the blades can be increased.

The modifications shown in FIGS. 12–20 may be selectively used depending on the specifications of the magnetic core and coils. They are capable of achieving the same results as described by referring to the embodiment shown in FIG. 9.

From the foregoing description, it will be appreciated that in the coil fitting system according to the invention, mutual interference between the coil end portions can be greatly reduced when a plurality of layers of coils are fitted in a magnetic core, and the coils can be fitted in the magnetic core in one operation step without suffering damage even if the plurality of coils have poor fitting conditions, such as a small coil pitch, a too large or too small diameter of the wire of the coils or a high volume ratio of the coils. An additional advantage offered by the invention is that shaping of the coil end portions into a predetermined shape and size can be readily achieved after fitting of the coils is effected.

What is claimed is:

1. A coil fitting system for force fitting a plurality of coils in slots of an iron core of an electric rotary machine, comprising:

a pressing number for pressing and force fitting the coils in said slots, said pressing member being formed with a multiplicity of grooves at its outer peripheral edge portion for slidably receiving blades for holding the coils to be pressed, said pressing member further comprising:

a first pressing surface for supporting a coil end portion of at least one coil; and a second pressing surface, in spaced-apart relation to said first pressing surface in a coil pressing direction, for supporting a coil end portion of another coil arranged in such a manner that a portion thereof overlaps a portion of the coil end portion supported on said first pressing surface, a portion of said first pressing surface extending into a region located at least on an extension in the coil pressing direction of said grooves located on said edge portion.

2. A coil fitting system as claimed in claim 1, wherein said portion of said first surface extends into the grooves in the outer peripheral edge portion of said second pressing surface.

3. A coil fitting system as claimed in claim 1, wherein a portion of said pressing member constituting said first pressing surface and a portion of said pressing member constituting said second pressing surface are formed as separate entities which are assembled into a unitary structure.

4. A coil fitting system as claimed in claim 1, wherein said first pressing surface end an outer and surface portion of the extension of said portion of the pressing member constituting said first pressing surface are contiguous with each other on a curved surface.

5. A coil fitting system as claimed in claim 1, wherein an outer end surface portion of the extension of said portion of the pressing member constituting said first pressing surface is protruding in the form of a cylinder.

6. A coil fitting system for force fitting a plurality of coils in slots of an iron core of an electric rotary machine, comprising:

an annular member constituted by a plurality of blades for holding the coils; and a pressing member formed at its peripheral edge portion with a plurality of grooves for allowing said blades to be slidably fitted therein, said pressing member being mounted in such a manner as to be movable in said annular member axially of the annular member;

wherein said pressing member further comprises a first pressing surface corresponding to a coil end portion of at least one of the coils, and a second pressing surface in spaced-apart relation to said first pressing surface in a coil pressing direction, for supporting a coil end portion of another coil arranged in such a manner that a portion thereof overlaps a portion of the coil end portion supported on to said first pressing surface whereby the coils placed in a predetermined position in said annular member can be force fitted in the slots of the iron core of the electric rotary machine as said pressing member moves relative to said annular member;

wherein the improvement resides in that:

an outer end surface portion of a portion of said first pressing surface extending into a region located at least on an extension in the coil pressing direction of said grooves located on said edge portion.

7. A coil fitting system as claimed in claim 6, wherein said outer end surface portion of said portion of said first pressing surface extends into the grooves corresponding to the region into which said outer end surface portion extends.

8. A coil fitting system as claimed in claim 6, wherein a portion of said pressing member constituting said first pressing surface and a portion of said pressing member constituting said second pressing surface are formed as separate entities which are assembled into a unitary structure.

9. A coil fitting system as claimed in claim 6, wherein said first pressing surface and said outer end surface portion are contiguous with each other on a curved surface.

10. A coil fitting system as claimed in claim 6, wherein said outer end surface portion of the portion of the pressing member constituting the first pressing surface is protruding in the form of a cylinder.

11. A coil fitting system as claimed in claim 6, wherein those blades which are fitted in the grooves, which have the region into which the outer end surface portion of the portion of the pressing member constituting the first pressing surface extends, are shaped such that they are cut out by an amount corresponding to the amount by which said outer end surface portion extends into said region.

12. A coil fitting system as claimed in claim 11, wherein said outer end surface portion of the portion of the pressing member constituting the first pressing surface and surfaces of the blades corresponding to the outer end surface portion interfit with each other.

13. A coil fitting system as claimed in claim 6, wherein those blades which are fitted in the grooves having said region into which said outer end surface portion of the portion of the pressing member constituting the first pressing surface extends are secured to said outer end surface portion, so that said blades constitute said extension.

* * * * *